United States Patent
Park et al.

(10) Patent No.: US 11,531,666 B1
(45) Date of Patent: Dec. 20, 2022

(54) INDEXING PARTITIONS USING DISTRIBUTED BLOOM FILTERS

(71) Applicant: Amazon Technologies, Inc., Seattle, WA (US)

(72) Inventors: Yangbae Park, Seattle, WA (US); Laxmi Siva Prasad Balaramaraju Jalumari, Redmond, WA (US); Daniel Opincariu, Redmond, WA (US); Fletcher Liverance, Berkley, MI (US); Zhuonan Song, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 16/998,922

(22) Filed: Aug. 20, 2020

(51) Int. Cl.
| | |
|---|---|
| *G06F 16/20* | (2019.01) |
| *G06F 16/22* | (2019.01) |
| *G06N 5/04* | (2006.01) |
| *G06N 20/00* | (2019.01) |
| *G06F 16/23* | (2019.01) |

(52) U.S. Cl.
CPC ...... *G06F 16/2272* (2019.01); *G06F 16/2379* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,260,909 B2 | 9/2012 | Schuba et al. | |
| 8,631,028 B1* | 1/2014 | Pettovello | G06F 16/8373 |
| | | | 707/765 |
| 8,972,337 B1 | 3/2015 | Gupta | |
| 9,367,574 B2 | 6/2016 | Gupta | |
| 9,501,527 B1 | 11/2016 | Chainani et al. | |
| 9,535,658 B2 | 1/2017 | Kolesnikov | |
| 9,971,809 B1 | 5/2018 | Tarsi et al. | |
| 10,210,195 B2 | 2/2019 | McKenna et al. | |
| 10,394,820 B2 | 8/2019 | Lavelle et al. | |
| 10,452,676 B2 | 10/2019 | Chen et al. | |
| 10,503,737 B1 | 12/2019 | Manville et al. | |
| 10,592,532 B2 | 3/2020 | Ryan et al. | |
| 10,678,791 B2 | 6/2020 | Chavan et al. | |
| 10,691,687 B2 | 6/2020 | Finlay et al. | |
| 10,698,898 B2 | 6/2020 | Khandelwal | |
| 10,719,512 B2 | 7/2020 | Chainani et al. | |
| 11,210,279 B2* | 12/2021 | Kachemir | G06F 16/2255 |

(Continued)

*Primary Examiner* — Jau Shya Meng
(74) *Attorney, Agent, or Firm* — Robert C. Kowert; Kowert, Hood, Munyon, Rankin & Goetzel, P.C.

(57) ABSTRACT

Methods, systems, and computer-readable media for indexing partitions using distributed Bloom filters are disclosed. A data indexing system generates a plurality of indices for a plurality of partitions in a distributed object store. The indices comprise a plurality of Bloom filters. An individual one of the Bloom filters corresponds to one or more fields of an individual one of the partitions. Using the Bloom filters, the data indexing system determines a first portion of the partitions that possibly comprise a value and a second portion of the partitions that do not comprise the value. Based (at least in part) on a scan of the first portion of the partitions and not the second portion of the partitions, the data indexing system determines one or more partitions of the first portion of the partitions that comprise the value.

20 Claims, 8 Drawing Sheets

(56) References Cited

U.S. PATENT DOCUMENTS

| | | | | |
|---|---|---|---|---|
| 2009/0063396 | A1* | 3/2009 | Gangarapu | G06F 16/2228 |
| 2017/0011073 | A1* | 1/2017 | Deshpande | G06F 16/215 |
| 2018/0129691 | A1* | 5/2018 | Mathur | G06F 16/2272 |

* cited by examiner

INDEXING PARTITIONS USING DISTRIBUTED BLOOM FILTERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for indexing partitions using distributed Bloom filters are described. Business entities and other organizations are increasingly reliant on very large data sets. For example, an entity that enables Internet-based sales from an electronic catalog of goods and services may maintain tens of thousands of data sets that collectively use petabytes of storage. Databases, data warehouses, and data lakes that are hosted using distributed systems may provide access to such data sets. Such systems may provide clients with access to collections of structured or unstructured data. A data set may include many records, each record having values in a plurality of fields. A data set may be divided into partitions to improve performance, e.g., to improve the performance of queries using query filters to restrict the number of partitions that are accessed. A very large data set may have tens of thousands or hundreds of thousands of partitions. For example, a data set may be partitioned by a field such as "day" such that data timestamped for one day is stored in a different partition than data timestamped for another day.

In some circumstances, queries for very large data sets can be prohibitively time-consuming and expensive. For example, when queries cannot be filtered by a partitioning key to restrict the number of partitions to be accessed, the entire set of partitions may need to be scanned. Some prior approaches for sorting data sets have used traditional indices, e.g., indices built using B+ trees. However, in a big data environment, sorting may not be feasible to perform across a large number of partitions and/or a large volume of data. Some prior approaches to searching data sets have used hash tables as data structures for efficient searches. However, in a big data environment, hashing can produce a very large volume of output such that the resulting indices are too expensive to maintain.

The aforementioned challenges, among others, are addressed by embodiments of the techniques described herein, whereby very large data sets may be searched efficiently using a distributed set of Bloom filters. A data lake comprising a distributed object store may contain a large amount of data that is infrequently updated. For example, an entity that enables Internet-based sales from an electronic catalog of goods and services may maintain one or more object stores to store data for customer orders. Older order information may be archived, e.g., in a data set that is partitioned by order date, such that no additional data is added to a partition after sufficient time has passed. Due to their infrequently changing nature, partitions in such a data set may be scanned once to create indices such as Bloom filters. In some embodiments, a Bloom filter is a space-efficient, probabilistic data structure that indicates whether a value is possibly included in a set or whether the value is definitely not in the set. For a given partition, Bloom filters may be generated for one or more fields to capture the possibility that particular values are found in the field(s). To determine the particular partitions that include a particular value, the Bloom filters may be used to identify candidate partitions that may possibly include the value while excluding non-candidate partitions that definitely do not include the value. By excluding a large number of non-candidate partitions using the Bloom filters, the remaining candidate partitions may be scanned efficiently to identify the relevant partitions that actually include records with the value. Using these techniques, for example, Bloom filters may be used to quickly find user data in a very large data set in order to provide a copy of the user data back to the user or delete the user data according to regulatory requirements (e.g., General Data Protection Regulation [GDPR] requirements).

As one skilled in the art will appreciate in light of this disclosure, embodiments may be capable of achieving certain technical advantages, including some or all of the following: (1) improving input/output (I/O) and network usage in a big data environment by using Bloom filters to restrict queries to a relatively small set of candidate partitions such that a larger set of irrelevant partitions need not be accessed; (2) improving the use of computing resources in a big data environment by using Bloom filters to restrict queries to a relatively small set of candidate partitions such that a larger set of irrelevant partitions need not be accessed; (3) improving the use of storage and memory resources in a big data environment by generating space-efficient Bloom filters to index a large number of partitions instead of using larger indices or hash tables; (4) improving the latency and performance of queries in a big data environment by adaptively sizing newly generated Bloom filters based (at least in part) on metrics such as data volume, number of records, and entropy; (5) improving the latency and performance of queries in a big data environment by replacing or augmenting existing Bloom filters with larger or smaller Bloom filters; (6) improving the latency of queries by using Bloom filters to restrict queries to a relatively small set of candidate partitions such that a larger set of irrelevant partitions need not be accessed; and so on.

Figure 1:
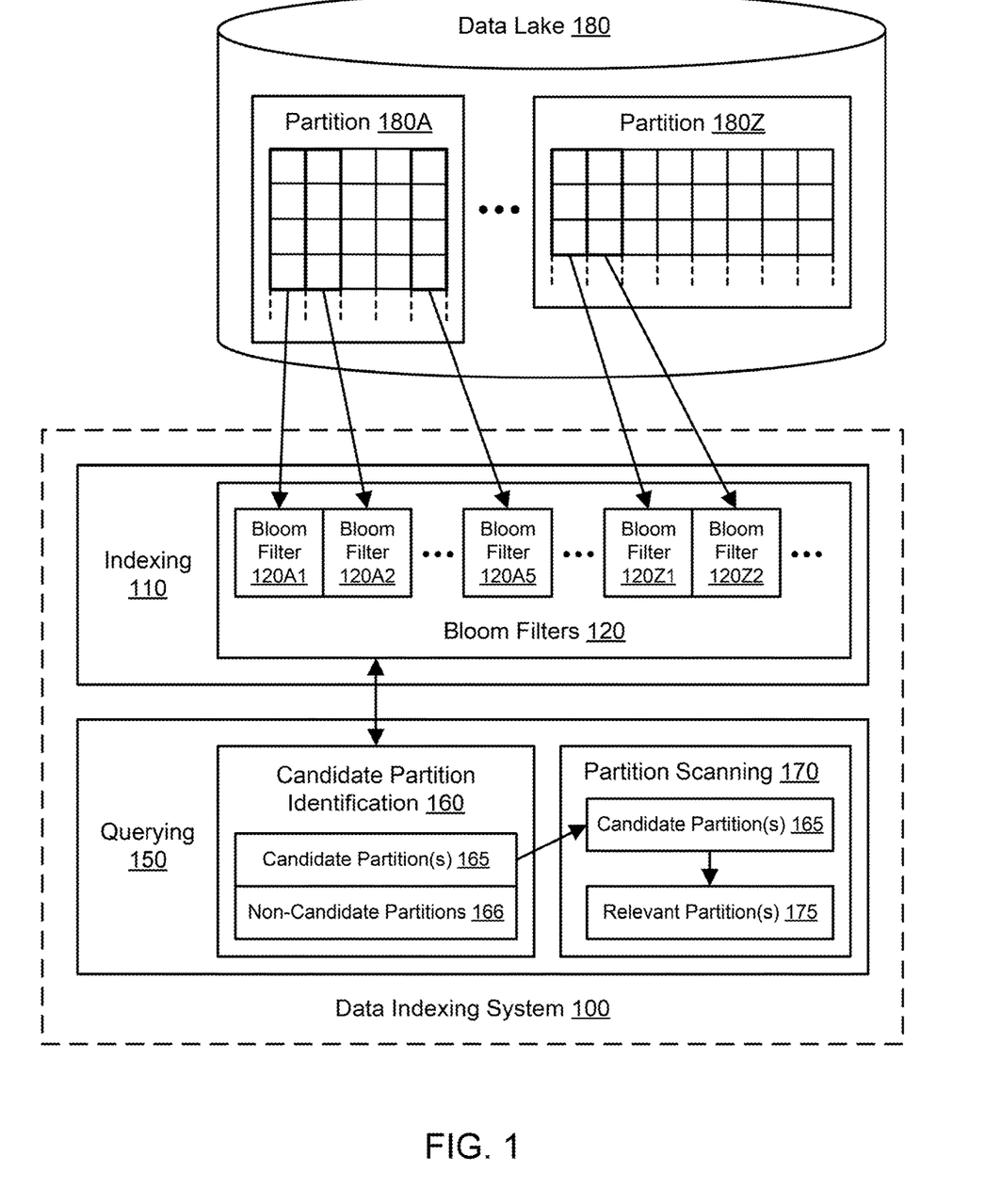
FIG. 1 illustrates an example system environment for indexing partitions using distributed Bloom filters, according to some embodiments.

FIG. 1 illustrates an example system environment for indexing partitions using distributed Bloom filters, according to some embodiments. A data indexing system 100 may provide clients with efficient read access to large sets of data such as a data lake 180. The data indexing system 100 may be accessible by clients via one or more networks such as the Internet. The data indexing system 100 and/or data lake 180 may be hosted in the cloud and/or implemented using a distributed system. The data lake 180 may include a distributed object store or distributed set of object stores that store objects such as records. The records may include values in various fields and may be stored according to no schema or a partial schema. The data lake 180 may be cataloged but not covered using traditional indexing techniques (e.g., B+ trees). The data lake 180 may capture very large amounts of data (e.g., petabytes of data) generated by one or more entities. A set of partitions 180A-180Z in the data lake 180 may, for example, be used to capture data regarding customer orders from an Internet-accessible electronic catalog. A particular data set may be divided into partitions to improve performance, e.g., to improve the performance of data access. A very large data set may have thousands or millions of partitions potentially representing terabytes of data. For example, a data lake 180 capturing customer order data may be partitioned by a field such as "day" such that data timestamped for one day is stored in a different partition than data timestamped for another day. However, the data lake 180 capturing customer order data may not be partitioned by another field such as the customer identifier. To quickly find data in the data lake 180 for a particular customer identifier (or other field that was not used for partitioning), the data indexing system 100 may generate a distributed set of Bloom filters 120 and use those filters to perform efficient queries in which only a portion of the partitions 180A-180Z are examined.

The data lake 180 may include a plurality of object stores that are stored in a distributed manner. The object stores may differ in their performance characteristics, application programming interfaces (APIs), storage architectures, and/or other attributes. Objects in one object store in the data lake 180 may represent a different structure and/or different data types than objects in another object store. Objects in the data lake 180 may include object blobs or files. Objects in the data lake 180 may include semi-structured data (e.g., CSV files, logs, XML files, JSON files, and so on). Objects in the data lake 180 may include unstructured data (e.g., e-mails, word processing documents, PDFs, and so on). Objects in the data lake 180 may include binary data (e.g., images, audio, and video). At least some of the objects in the data lake 180 may not be tables that organize data by rows and columns. In some embodiments, at least some of the records may be stored in the data lake 180 without using a schema. A schema may represent a formal definition of the structure or organization of a data store. In some embodiments, at least some of the records may be stored in the data lake 180 according to a partial schema. A partial schema may partially but not completely define the structure or organization of a data store. In some embodiments, some of the records may be stored in one object store according to a partial schema that differs from others of the records in another object store.

At least some of the data lake 180 may be archived, infrequently updated, and/or read-only under normal use, at least after a period of time. For example, an entity that enables Internet-based sales from an electronic catalog of goods and services may maintain one or more data sets to store data for customer orders. Older order information may be archived, e.g., in a data set that is partitioned by order date such that no additional data is added to a partition after sufficient time has passed since the corresponding date of the partition. Due to their infrequently changing nature, the partitions 180A-180Z may be scanned once to create indices that can be used again and again for new queries of the partitions. The data indexing system 100 may include a component 110 for indexing of the data lake 180. The indexing 110 may generate a plurality of Bloom filters 120. In some embodiments, a Bloom filter is a space-efficient, probabilistic data structure that indicates whether a value is possibly included in a set of values or whether the value is definitely not in the set. A query of a Bloom filter may return false positives but not false negatives.

A Bloom filter may be generated by applying one or more hash functions to a set of values. A Bloom filter may include a bit array, and values in the set may be mapped (via the hash function(s)) to positions in the bit array. An empty Bloom filter may represent an array of n bits that are initially set to zero. Each hash function in a set of h hash functions (h 1) may map some value to one of the n array positions in a uniform random distribution. The size n of the Bloom filter may be proportional to a small constant representing a desired false positive rate and/or proportional to the number of values to be added to the filter. A value may be added to the Bloom filter by providing it to each of the h hash functions to get h array positions. The bits at those array positions may be set to 1. In some embodiments, additional values may be added to a Bloom filter, but values may not be removed from the filter.

For a given partition that includes data values in different fields, a plurality of Bloom filters may be generated for one or more fields to capture the possibility that particular values are found in the field(s). As shown in the example of FIG. 1, the partitions for one or more data sets may include partitions 180A through 180Z. A Bloom filter 120A1 may be generated by the indexing component 110 to represent the first field of the partition 180A, another Bloom filter 120A2 may be generated by the indexing component to represent the second field of the partition 180A, yet another Bloom filter 120A5 may be generated by the indexing component to represent the fifth field of the partition 180A, and so on. Similarly, a Bloom filter 120Z1 may be generated by the indexing component 110 to represent the first field of the partition 180Z, another Bloom filter 120Z2 may be generated by the indexing component to represent the second field of the partition 180Z, and so on. In some embodiments, one Bloom filter may be generated per field per partition. In some embodiments, a plurality of Bloom filters may be generated per field per partition. In some embodiments, one Bloom filter may be generated per a plurality of fields. In various embodiments, Bloom filters may be generated for all of the fields in a partition or for only some of the fields in a partition. In some embodiments, a portion of fields may be selected for indexing using Bloom filters based (at least in part) on machine learning techniques that identify common or anticipated query attributes, while other fields may not be indexed using Bloom filters. The resulting set of Bloom filters 120 may be space-efficient and may require much less storage than a set of traditional indices (e.g., B+ trees) or hash tables usable for searching the data lake 180.

The data indexing system 100 may include a component 150 for efficiently querying the data lake 180 using the Bloom filters 120. To begin searching a particular data set for a particular value, the querying component 150 may search the Bloom filters corresponding to the data set's partitions to determine the partitions that definitely do not include the value and also determine the partitions that possibly include the value. For example, to search a data set of customer order data for a particular customer ID, the querying component 150 may search the Bloom filters corresponding to the data set's partitions to exclude the partitions that definitely do not include the customer ID from additional scanning. To determine the particular partitions that include a particular value, a component 160 for candidate partition identification may use the Bloom filters 120 to identify candidate partitions 165 that may possibly include the value (false positives and/or true positives) while excluding non-candidate partitions 166 that definitely do not include the value (true negatives).

The querying component 150 may determine whether a value is present in a Bloom filter by providing the value to each of the h hash functions to get h array positions. If any of the bits at these positions is zero, then the querying component 150 may determine that the value is definitely not in the set (and thus definitely not present in the field(s) corresponding to the Bloom filter). However, if all of the bits at these positions are 1, then the querying component 150 may determine that the value is possibly in the set (and thus may or may not be present in the field(s) corresponding to the Bloom filter). The "possible yes" result may represent a false positive if the bits were set to 1 during the insertion of other values. If all of the Bloom filters for a given partition yielded a "definite no" result, then the querying component 150 may assign that partition to the set of non-candidate partitions 166. If any of the Bloom filters for a given partition yielded a "possible yes" result, then the querying component 150 may assign that partition to the set of candidate partitions 165.

To determine the particular partitions that actually include a particular value, a component 170 for partition scanning may examine the candidate partitions 165 and not the non-candidate partitions 166 to identify one or more partitions 175 that actually include the value. The partition(s) 175 that actually include the value may be referred to as relevant partitions. By excluding a large number of non-candidate partitions 166 using the Bloom filters 120, the remaining candidate partitions 165 may be scanned efficiently to identify the relevant partitions 175 that actually include the value in one or more records. Even if the query of the Bloom filters 120 yielded a small number of false positives, the resources required to scan these additional partitions may be a small fraction of the resources that would otherwise be required to scan the entire data set.

The data indexing system 100 may use Bloom filters 120 for efficient querying of large data sets for a variety of purposes. For example, the Bloom filters 120 may be used to quickly find user data or customer data in a very large data set. The user data or customer data may be reported back to the user or deleted from the data lake 180 according to regulatory requirements (e.g., General Data Protection Regulation [GDPR] requirements). Without the data indexing system 100 and the use of Bloom filters 120, such a task may consume a prohibitive amount of computing resources (e.g., processors, memory, I/O, etc.) and compute time for a single query. By restricting a scan to only a small set of candidate partitions rather than the entire data set, the data indexing system 100 may significantly reduce the amount of computing resources (e.g., processors, memory, I/O, etc.) and the resulting cost for a query of a very large data set.

In one embodiment, one or more components of the data indexing system 100 and/or the data lake 180 may be implemented using resources of a provider network. The provider network may represent a network set up by an entity such as a private-sector business or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the data indexing system 100 and/or data lake 180. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the data indexing system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the data indexing system 100, may be offered to clients in exchange for fees.

Figure 8:
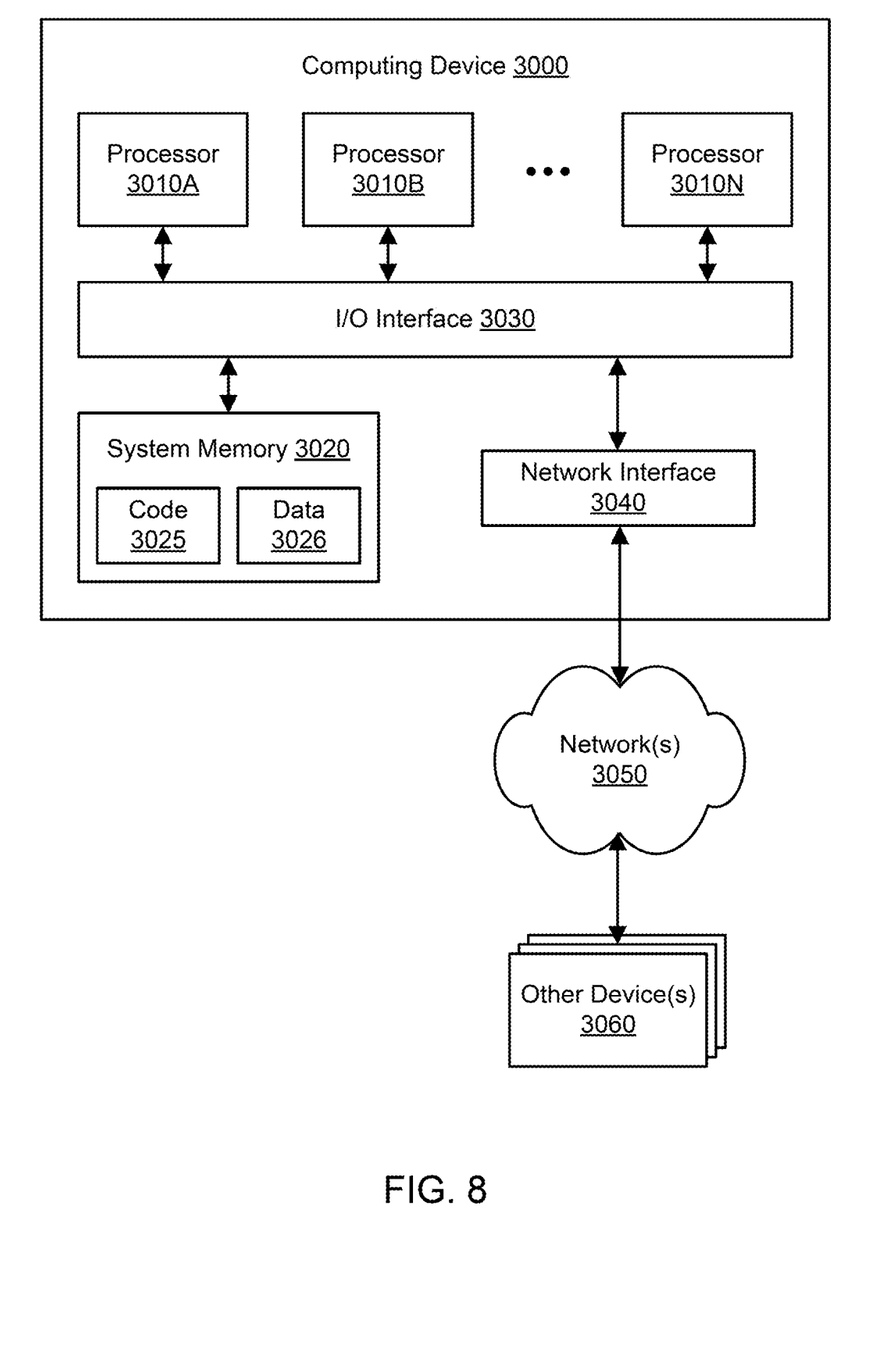
FIG. 8 illustrates an example computing device that may be used in some embodiments.

In various embodiments, components of the data indexing system 100 and/or data lake 180 may be implemented using any suitable set number and configuration of computing devices, any of which may be implemented by the example computing device 3000 illustrated in FIG. 8. In some embodiments, the computing devices may be located in any suitable number of data centers or geographical locations. In various embodiments, at least some of the functionality of the data indexing system 100 may be provided by the same computing device or by different computing devices. In various embodiments, if any of the components of the data indexing system 100 are implemented using different computing devices, then the components and their respective computing devices may be communicatively coupled, e.g., via one or more networks. Any of the components of the data indexing system 100 may represent any combination of software and hardware usable to perform their respective functions. In some embodiments, operations implemented by the data indexing system 100 may be performed automatically, e.g., without a need for user initiation or user intervention after an initial configuration stage, and/or programmatically, e.g., by execution of program instructions on at least one computing device. In some embodiments, the data indexing system 100 may include additional components not shown, fewer components than shown, or different combinations, configurations, or quantities of the components shown.

Clients of the data indexing system 100 may represent external devices, systems, or entities. Client devices may be managed or owned by one or more clients of the data indexing system 100 and/or data lake 180. In one embodiment, the client devices may be implemented using any suitable number and configuration of computing devices, any of which may be implemented by the example computing device 3000 illustrated in FIG. 8. Clients may convey network-based service requests to the data indexing system 100 via one or more networks, e.g., to submit queries to be processed using Bloom filters 120. The network(s) may encompass any suitable combination of networking hardware and protocols necessary to establish network-based communications between client devices and the data indexing system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the data indexing system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the data indexing system 100. In one embodiment, client devices may communicate with the data indexing system 100 using a private network rather than the public Internet. In various embodiments, the various components of the data indexing system 100 may also communicate with other components of the database using one or more network interconnects.

Figure 2:
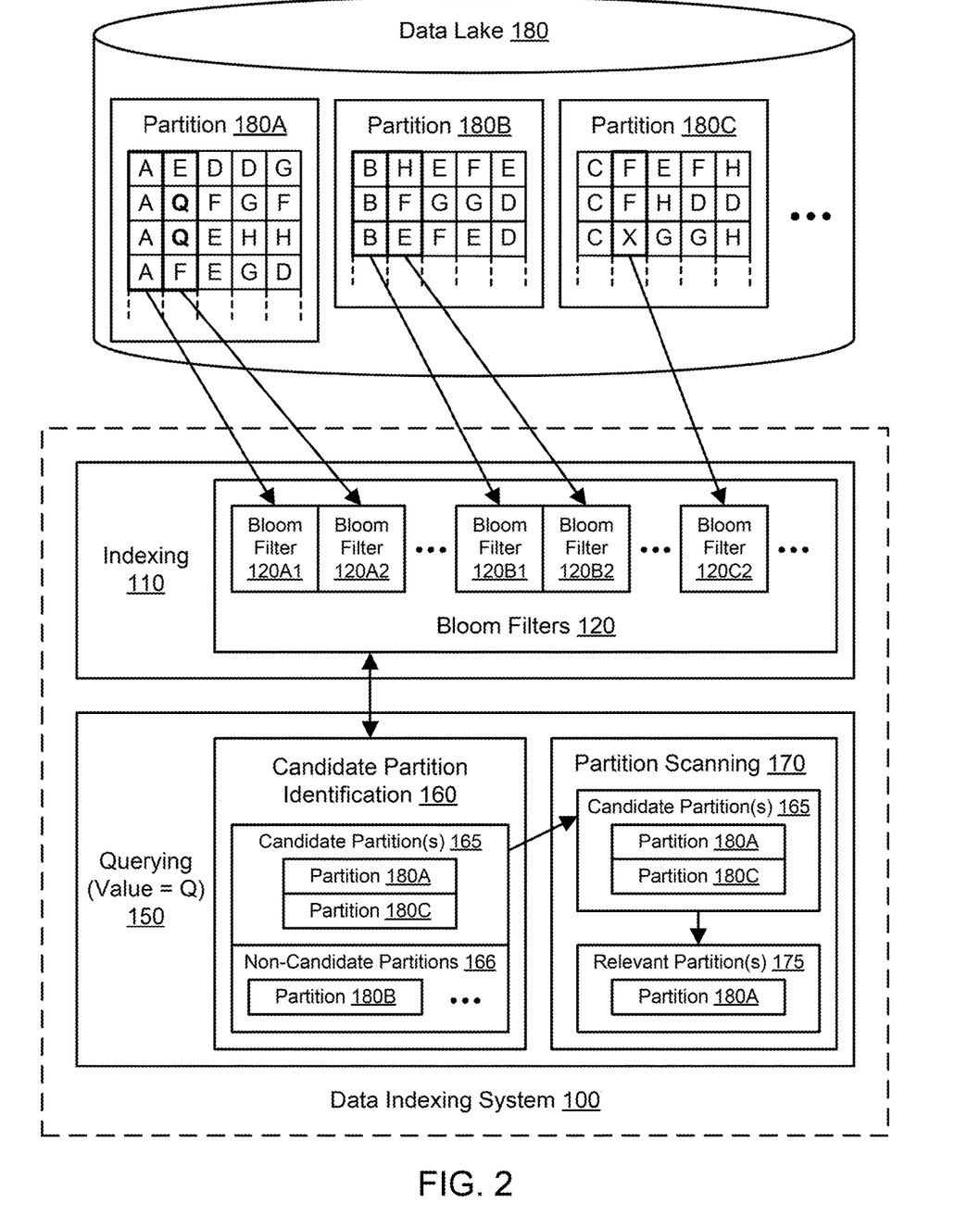
FIG. 2 illustrates further aspects of the example system environment for indexing partitions using distributed Bloom filters, including an example query that uses the Bloom filters to restrict the set of partitions to be scanned, according to some embodiments.

FIG. 2 illustrates further aspects of the example system environment for indexing partitions using distributed Bloom filters, including an example query that uses the Bloom filters to restrict the set of partitions to be scanned, according to some embodiments. In the example of FIG. 2, partitions 180A, 180B, and 180C may belong to a single data set. The data set may include a potentially large number of additional partitions that are not shown. The data set may, for example, capture data associated with customer orders of good and services from an Internet-accessible electronic catalog. For purposes of illustration, the various fields in the partitions 180A-180C may include values such as A, B, C, D, E, F, G, H, and so on. The partitions 180A-180C may be partitioned according to a field such as the time period of the order. For example, the first fields of the partitions 180A-180C may represent the partitioning field. However, a query of the data set may seek data associated with a different field such as customer ID. To facilitate fast searching of the partitions 180A-180B by a non-partitioning field such as customer ID, the data indexing system 100 may generate a set of Bloom filters corresponding to fields (or other collections of values) of the partitions 180A-180C.

For a given one of the partitions 180A-180C, a plurality of Bloom filters may be generated for one or more fields to capture the possibility that particular values are found in the field(s). As shown in the example of FIG. 2, a Bloom filter 120A1 may be generated by the indexing component 110 to represent the first field of the partition 180A, a Bloom filter 120A2 may be generated by the indexing component to represent the second field of the partition 180A, a Bloom filter 120B1 may be generated by the indexing component 110 to represent the first field of the partition 180B, a Bloom filter 120B2 may be generated by the indexing component to represent the second field of the partition 180B, a Bloom filter 120C2 may be generated by the indexing component 110 to represent the second field of the partition 180C, and so on. The resulting set of Bloom filters 120 may be space-efficient and may require much less storage than a set of traditional indices (e.g., B+ trees) or hash tables usable for searching the partitions 180A-180C.

To begin searching the partitions 180A-180C of the data set for a particular value Q for a customer ID field, the querying component 150 may search the Bloom filters 120 corresponding to the data set's partitions to determine the partitions that definitely do not include the value Q and also determine the partitions that possibly include the value Q. In some embodiments, the query may be restricted to Bloom filters that correspond to fields that are known to include customer IDs. For example, if the first field in the partitions 180A-180C includes the partitioning field of the order date and the second field includes the customer ID of an order, then the querying 150 may use the Bloom filters corresponding to the second field (e.g., Bloom filters 120A2, 120B2, and 120C2) and not use other Bloom filters (e.g., Bloom filters 120A1 and 120B1). In some embodiments, the query may instead use the Bloom filters that correspond to all of the fields in the partitions 180A-180C.

If all of the Bloom filters for a given partition yielded a "definite no" result for inclusion of the value Q, then the querying component 150 may assign that partition to the set of non-candidate partitions 166. In the example shown in FIG. 2, the non-candidate partitions 166 may include the partition 180B. The non-candidate partitions may include a potentially large number of additional partitions that are not shown. If any of the Bloom filters for a given partition yielded a "possible yes" result, then the querying component 150 may assign that partition to the set of candidate partitions 165. In the example shown in FIG. 2, the candidate partitions 165 may include partition 180A due to the inclusion of the value Q that yielded a true positive for the value Q and the partition 180C due to the inclusion of value X that yielded a false positive for the value Q.

In some embodiments, other probabilistic data structures or algorithms that may return false positives may be used instead of Bloom filters. In some embodiments, the querying 150 may use one or more machine learning techniques to restrict the set of candidate partitions 165. The one or more machine learning techniques may be used to predict the contents of partitions or fields so that queries can be restricted to a smaller set of partitions. The one or more machine learning techniques may augment the use of Bloom filters using features of the data to be queried. In some embodiments, one or more machine learning techniques may be used to automatically select a particular Bloom filter algorithm according to cost/benefit targets or to replace a Bloom filter algorithm with a different algorithm. The automatically selected algorithm may yield false negatives but may achieve performance and/or cost advantages, e.g., for data sets where "best effort" queries are acceptable. For example, for partitions that are more frequently updated, Bloom filters may require more frequent recalculation, while some machine learning algorithms may be trained once and then used for repeated predictions based on the learned behavior and regardless of updates to the partitions.

To determine the particular partitions that actually include the particular value Q in one or more records, the component 170 for partition scanning may examine the candidate partitions 165 and not the non-candidate partitions 166 to identify one or more partitions 175 with records that actually include the value Q. The partition(s) 175 that actually include the value Q may be referred to as relevant partitions and may include only the partition 180A. By excluding non-candidate partitions 166 using the Bloom filters 120, the remaining candidate partitions 165 may be scanned efficiently to identify the relevant partitions 175 that actually include the value Q. Even if the query of the Bloom filters 120 yielded a small number of false positives such as partition 180C, the resources required to scan these additional partitions may be a small fraction of the resources that would otherwise be required to scan the entire data set.

Figure 3:
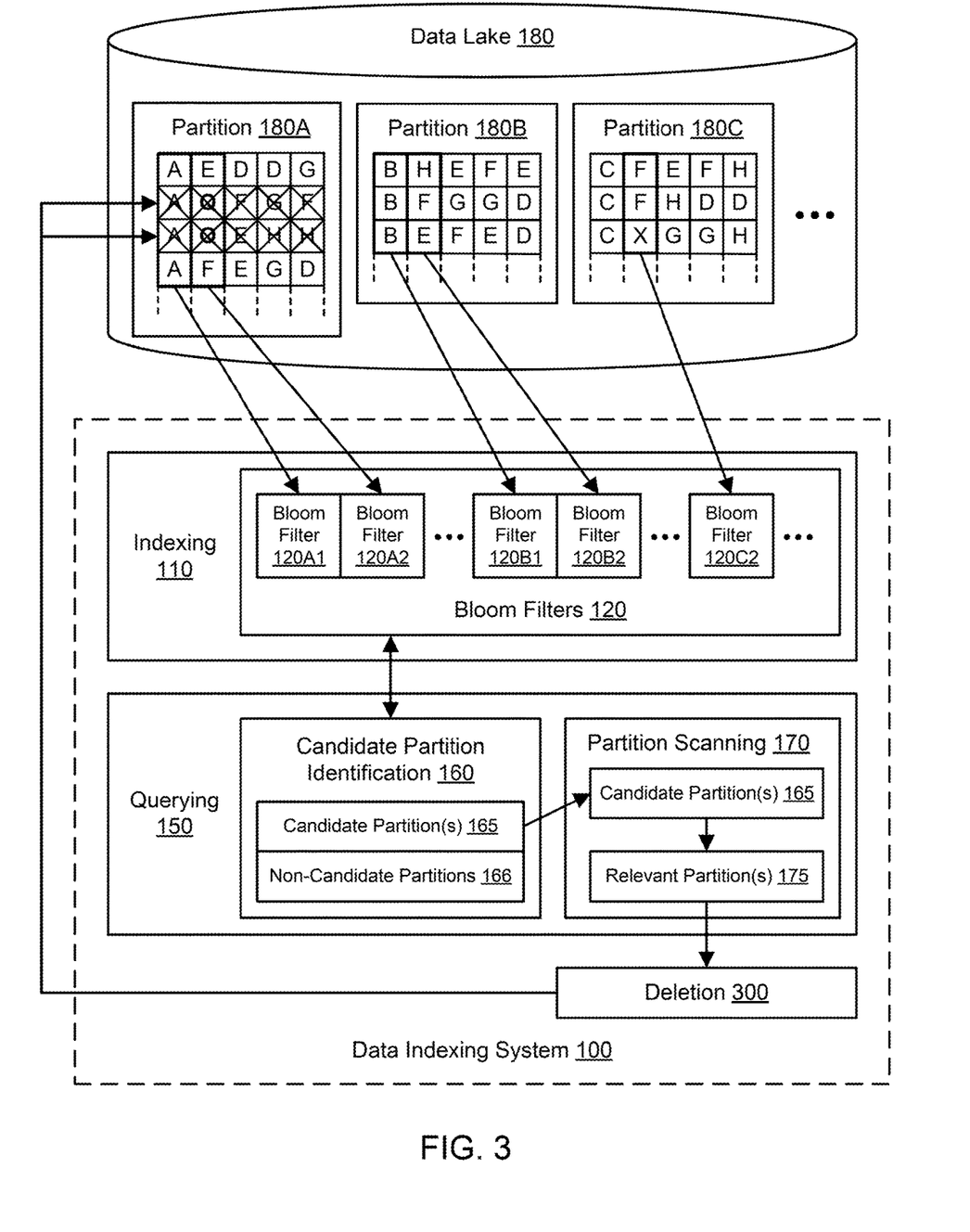
FIG. 3 illustrates further aspects of the example system environment for indexing partitions using distributed Bloom filters, including deletion of data in a partition identified using the Bloom filters, according to some embodiments. schema

FIG. 3 illustrates further aspects of the example system environment for indexing partitions using distributed Bloom filters, including deletion of data in a partition identified using the Bloom filters, according to some embodiments. As discussed above, the data indexing system 100 may use Bloom filters 120 for efficient querying of large data sets for a variety of purposes. For example, the Bloom filters 120 may be used to quickly find user data or customer data in a very large data set such as the customer order data set that includes partitions 180A-180C. The user data or customer data may be reported back to the user or deleted from the data lake 180 according to regulatory requirements (e.g., General Data Protection Regulation [GDPR] requirements). Using the Bloom filters 120 as discussed with reference to FIG. 2, all records associated with the customer ID value Q may be quickly located in the partitions 180A-180C. As shown in the example of FIG. 3, at least two records may be found with the customer ID value Q. Using a component 300 for deletion, the records that include the customer ID value Q may be deleted from the partition 180A. Without the data indexing system 100 and the use of Bloom filters 120, such a deletion task may consume a prohibitive amount of computing resources (e.g., processors, memory, I/O, etc.) and compute time for a single query. By restricting a scan to only a small set of candidate partitions rather than the entire data set in order to delete customer data, the data indexing system 100 may significantly reduce the amount of computing resources (e.g., processors, memory, I/O, etc.) and the resulting cost for a query of a very large data set.

Figure 4:
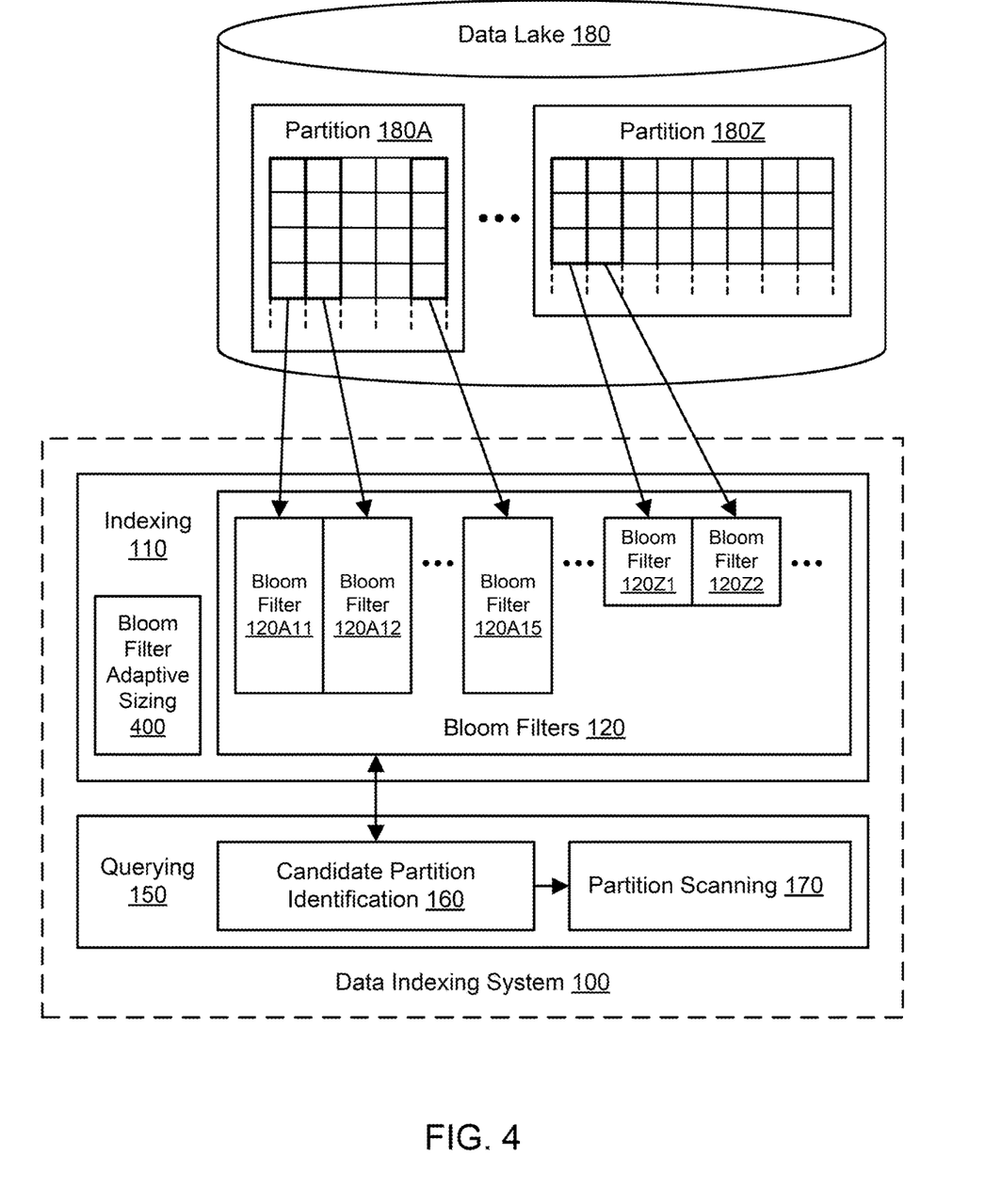
FIG. 4 illustrates further aspects of the example system environment for indexing partitions using distributed Bloom filters, including adaptive sizing of the Bloom filters, according to some embodiments.

FIG. 4 illustrates further aspects of the example system environment for indexing partitions using distributed Bloom filters, including adaptive sizing of the Bloom filters, according to some embodiments. In some embodiments, Bloom filters 120 may be generated using adaptive sizing 400 such that the size of the filters is optimized. A Bloom filter may be characterized by the size of the bit array, e.g., the number of individual positions within the array. In some embodiments, the size of a newly generated Bloom filter may be determined based (at least in part) on metrics such as the data volume of the corresponding partition, the number of records in the corresponding partition, the entropy of the data set, the allowable false positive rate of the Bloom filter, and so on. The entropy metric, also referred to as Shannon entropy, may represent the average level of information or uncertainty in the possible outcome of a variable.

As shown in the example of FIG. 4, using Bloom filter adaptive sizing 400, the Bloom filters generated for the partition 180A may be larger than the Bloom filters generated for the partition 180Z. A Bloom filter 120A11 may be generated by the indexing component 110 to represent the first field of the partition 180A, another Bloom filter 120A12 may be generated by the indexing component to represent the second field of the partition 180A, yet another Bloom filter 120A15 may be generated by the indexing component to represent the fifth field of the partition 180A, and so on. Similarly, a Bloom filter 120Z1 may be generated by the indexing component 110 to represent the first field of the partition 180Z, another Bloom filter 120Z2 may be generated by the indexing component to represent the second field of the partition 180Z, and so on. Based (at least in part) on one or more metrics such as the data volume of the corresponding partitions, the number of records in the corresponding partitions, the entropy of the values in the corresponding fields, and/or the allowable false positive rate of the Bloom filter, the Bloom filters 120A11, 120A12, and 120A15 may be initialized to a larger size than the Bloom filters 120Z1 and 120Z2. In some embodiments, the indexing 110 may generate Bloom filters in a limited number of step sizes such as a 1× size, a 2× size, a 4× size, an 8× size, and so on. For example, the Bloom filters 120A11, 120A12, and 120A15 may be created in the 2× size, while the Bloom filters 120Z1 and 120Z2 may be created in the 1× size.

In some embodiments, the adaptive sizing 400 may use one or more machine learning techniques to determine appropriate sizes for Bloom filters for particular partitions. The one or more machine learning techniques may be used to predict the contents of partitions or fields so that features of data to be queried may be used to augment queries. In some embodiments, instead of manually selecting Bloom filter sizes or using heuristics such as a percentage of the partition volume, the one or more machine learning techniques may identify a Bloom filter size according to trade-offs between the costs and benefits of various sizes.

By adaptively sizing Bloom filters, the system 100 may improve the performance of queries. Adaptive sizing 400 may strike a balance between the size of Bloom filters and the false positive rate. Decreasing the size of a Bloom filter may reduce the storage and memory requirements for the filter. Increasing the size of a Bloom filter may reduce the false positive rate, which may then decrease the need to scan candidate partitions that do not actually include a value associated with a query.

Figure 5:
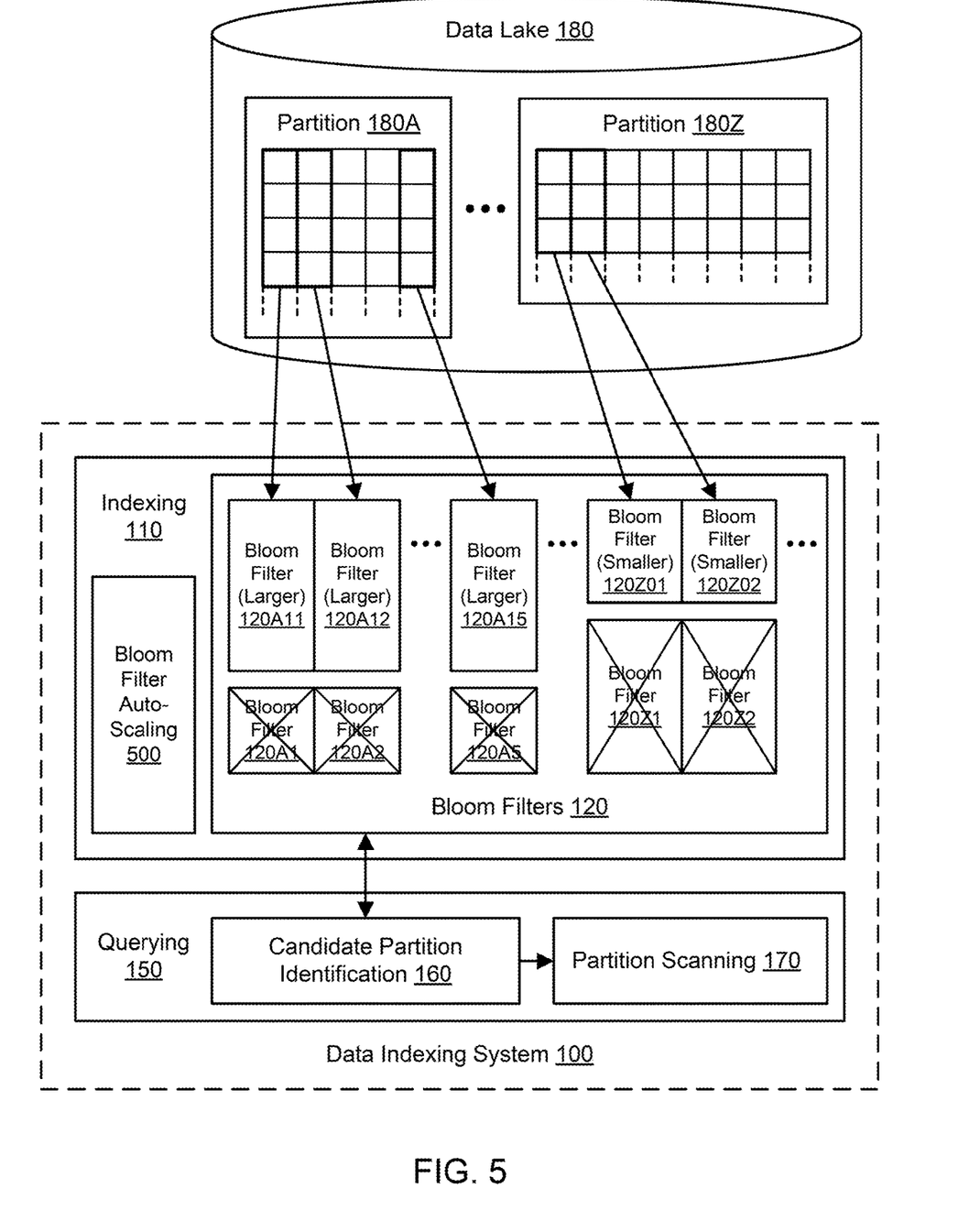
FIG. 5 illustrates further aspects of the example system environment for indexing partitions using distributed Bloom filters, including auto-scaling of the Bloom filters with replacement of one size of a Bloom filter with another size, according to some embodiments.

FIG. 5 illustrates further aspects of the example system environment for indexing partitions using distributed Bloom filters, including auto-scaling of the Bloom filters with replacement of one size of a Bloom filter with another size, according to some embodiments. In some embodiments, Bloom filters 120 may be replaced or augmented with filters of different sizes using auto-scaling 500 such that size of the filters is optimized. A Bloom filter may be characterized by the size of the bit array, e.g., the number of individual positions within the array. In some embodiments, the size of a Bloom filter may be determined based (at least in part) on metrics such as the data volume of the corresponding partition, the number of records in the corresponding partition, the entropy of the data set, the allowable false positive rate of the Bloom filter, and so on. The entropy metric, also referred to as Shannon entropy, may represent the average level of information or uncertainty in the possible outcome of a variable.

In some embodiments, Bloom filters and/or corresponding partitions may be monitored for such metrics after one or more Bloom filters have been created for the corresponding partitions. If one or more thresholds are exceeded by the metrics, then a Bloom filter may be replaced with an equivalent Bloom filter of a larger or smaller size. For example, if a partition 180A is experiencing an increased number of searches, or the observed false positive rate is too high, then one or more Bloom filters for that partition may be replaced by larger versions. As shown in FIG. 5, Bloom filter 120A1 may be replaced by a larger version 120A11, Bloom filter 120A2 may be replaced by a larger version 120A12, Bloom filter 120A5 may be replaced by a larger version 120A15, and so on. As another example, if a partition 180Z is experiencing a reduced number of searches, or the observed false positive rate is low, then one or more Bloom filters for that partition may be replaced by smaller versions. As shown in FIG. 5, Bloom filter 120Z1 may be replaced by a smaller version 120Z01, Bloom filter 120Z2 may be replaced by a smaller version 120Z02, and so on. In some embodiments, the replacement versions of the Bloom filters may be generated by the indexing component 110 using another scan of the corresponding partitions. The replaced versions may be deprecated after a period of time.

Figure 6:
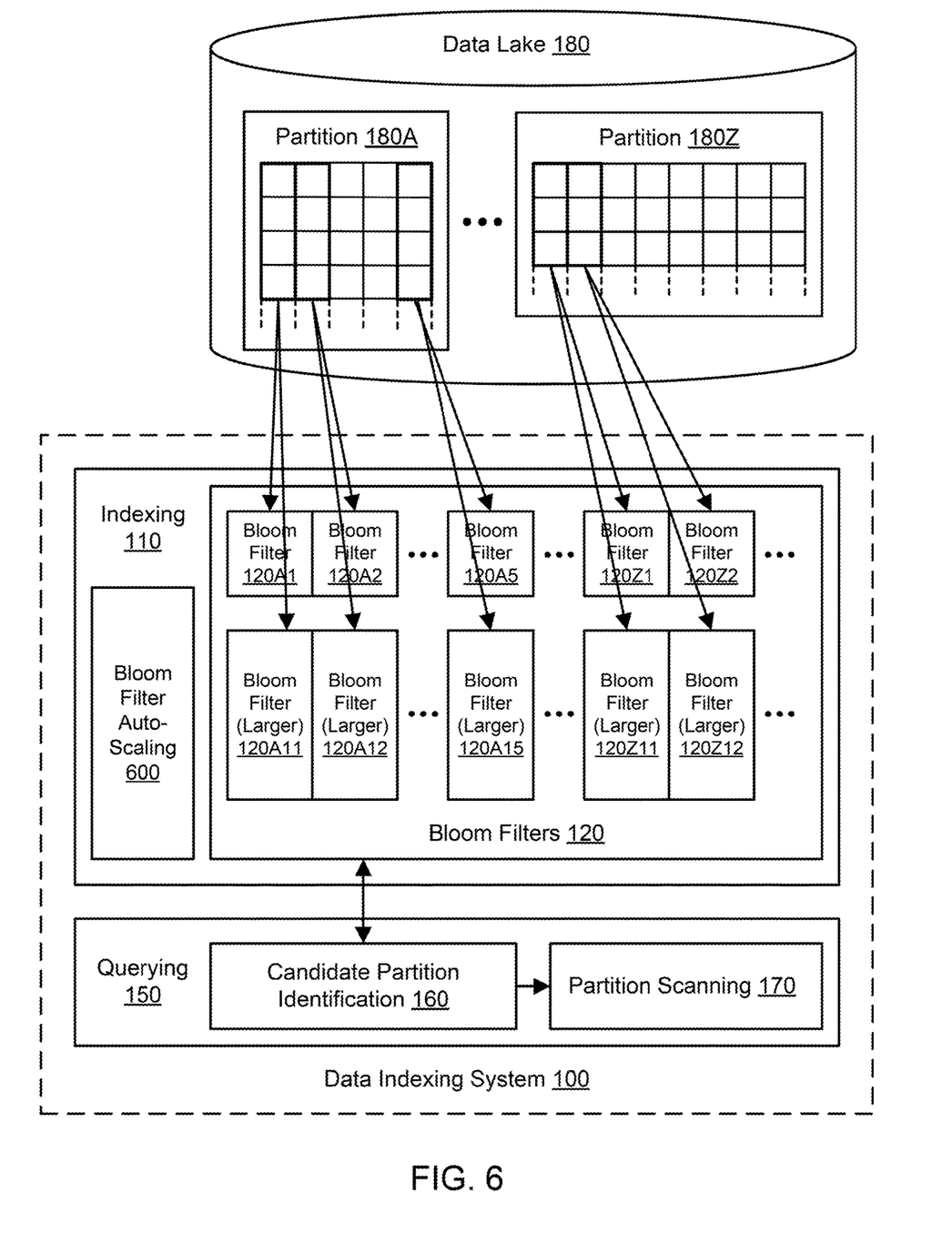
FIG. 6 illustrates further aspects of the example system environment for indexing partitions using distributed Bloom filters, including auto-scaling of the Bloom filters with maintenance of differently sized Bloom filters for the same partition, according to some embodiments.

FIG. 6 illustrates further aspects of the example system environment for indexing partitions using distributed Bloom filters, including auto-scaling of the Bloom filters with maintenance of differently sized Bloom filters for the same partition, according to some embodiments. In some embodiments, Bloom filters 120 may be replaced or augmented with filters of different sizes using auto-scaling 600 such that size of the filters is optimized. A Bloom filter may be characterized by the size of the bit array, e.g., the number of individual positions within the array. In some embodiments, the size of a Bloom filter may be determined based (at least in part) on metrics such as the data volume of the corresponding partition, the number of records in the corresponding partition, the entropy of the data set, the allowable false positive rate of the Bloom filter, and so on. The entropy metric, also referred to as Shannon entropy, may represent the average level of information or uncertainty in the possible outcome of a variable.

In some embodiments, Bloom filters for a given field may be created in different sizes. As shown in FIG. 6, a smaller Bloom filter 120A1 and a larger version 120A11 may be created for the first field of partition 180A, a smaller Bloom filter 120A2 and a larger version 120A12 may be created for the second field of partition 180A, a smaller Bloom filter 120A5 and a larger version 120A15 may be created for the fifth field of partition 180A, a smaller Bloom filter 120Z1 and a larger version 120Z11 may be created for the first field of partition 180Z, a smaller Bloom filter 120Z2 and a larger version 120Z12 may be created for the second field of partition 180Z, and so on. In some embodiments, the indexing 110 may generate Bloom filters in a limited number of step sizes such as a 1× size, a 2× size, a 4× size, an 8× size, and so on, for the same corresponding field. The Bloom filters in different sizes may be concurrently maintained for at least some period of time, e.g., while the Bloom filters and/or corresponding partitions are monitored for metrics such as data volume, number of records, entropy, false positive rate, and so on. Based (at least in part) on the metrics, a Bloom filter of a particular size may be selected for use in querying a particular partition.

In some embodiments, the auto-scaling 500 and/or 600 may use one or more machine learning techniques to determine appropriate sizes for Bloom filters for particular partitions. The one or more machine learning techniques may be used to predict the contents of partitions or fields so that features of data to be queried may be used to augment queries. In some embodiments, instead of manually selecting Bloom filter sizes or using heuristics such as a percentage of the partition volume, the one or more machine learning techniques may identify a Bloom filter size according to trade-offs between the costs and benefits of various sizes.

By auto-scaling Bloom filters as shown in FIG. 5 and FIG. 6, the system 100 may improve the performance of queries. Auto-scaling 500 and 600 may strike a balance between the size of Bloom filters and the false positive rate. Decreasing the size of a Bloom filter may reduce the storage and memory requirements for the filter. Increasing the size of a Bloom filter may reduce the false positive rate, which may then decrease the need to scan candidate partitions that do not actually include a value associated with a query.

Figure 7:
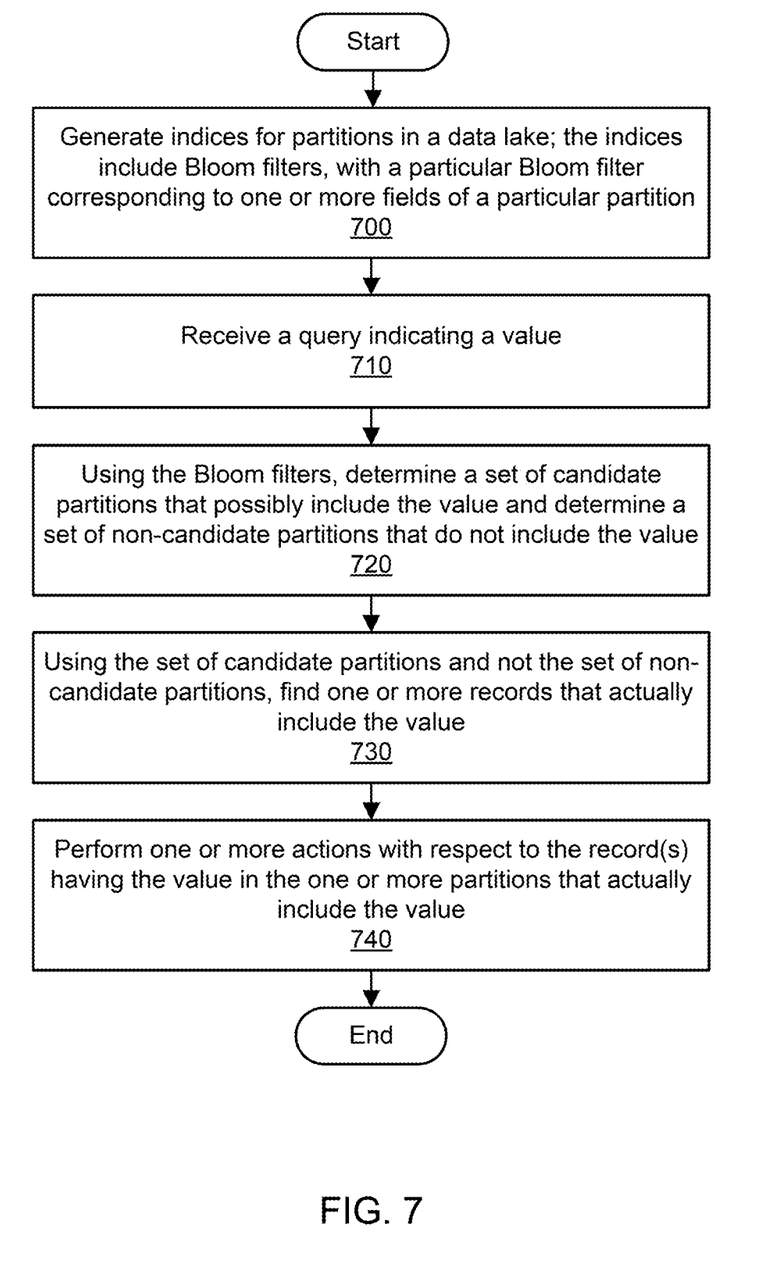
FIG. 7 is a flowchart illustrating a method for indexing partitions using distributed Bloom filters, according to some embodiments.

FIG. 7 is a flowchart illustrating a method for indexing partitions using distributed Bloom filters, according to some embodiments. As shown in 700, a plurality of indices may be generated for a plurality of partitions. The partitions may be stored using one or more object stores in a data lake. The partitions may be archived, infrequently updated, and/or read-only under typical circumstances. For example, an entity that enables Internet-based sales from an electronic catalog of goods and services may maintain one or more data sets to store data for customer orders. The indices may include probabilistic data structures. For example, the indices may include a plurality of Bloom filters. A given Bloom filter may correspond to a given field of a given partition. In some embodiments, a Bloom filter is a space-efficient, probabilistic data structure that indicates whether a value is possibly included in a set of values or whether the value is definitely not in the set. A query of a Bloom filter may return false positives but not false negatives. The resulting set of Bloom filters may be space-efficient and may require much less storage than a set of traditional indices (e.g., B+ trees) or hash tables usable for searching the partitions.

As shown in 710, a query may be received that indicates a value. The partitions may be partitioned according to a field such as the time period of customer orders of good and services from an Internet-accessible electronic catalog. However, the query of the data set may seek data associated with a different field such as customer ID. To facilitate fast searching of the partitions by a non-partitioning field such as customer ID, the Bloom filters may be used to determine partitions that may include the value for the field.

As shown in 720, using the Bloom filters or other probabilistic data structures, a set of candidate partitions and a set of non-candidate partitions may be determined. To begin querying a particular data set for a particular value indicated in the query, the Bloom filters corresponding to the data set's partitions may be used to determine the non-candidate partitions that definitely do not include the value and also determine the candidate partitions that possibly include the value. For example, to search a data set of customer order data for a particular customer ID, the Bloom filters corresponding to the data set's partitions may be used to exclude the partitions that definitely do not include the customer ID from additional scanning. If all of the Bloom filters for a given partition yield a "definite no" result, then that partition may be assigned to the set of non-candidate partitions. If any of the Bloom filters for a given partition yields a "possible yes" result, then that partition may be assigned to the set of candidate partitions.

As shown in 730, using the set of candidate partitions and not the set of non-candidate partitions, one or more partitions that actually include the value in one or more records may be determined. To determine the particular partitions that actually include a particular value, the candidate partitions and not the non-candidate partitions may be scanned or examined to identify one or more partitions that actually include the value indicated in the query. The partition(s) that actually include the value may be referred to as relevant partitions. By excluding a large number of non-candidate partitions using the Bloom filters, the remaining candidate partitions may be scanned efficiently to identify the relevant partitions that actually include the value in one or more records. Even if the query of the Bloom filters yields a small number of false positives, the resources required to scan these additional partitions may be a small fraction of the resources that would otherwise be required to scan the entire data set.

As shown in 740, one or more actions may be performed with respect to the one or more records associated with the value. The one or more actions may be performed for the one or more partitions that actually include the value and not for other partitions (e.g., non-candidate partitions and partitions that were candidates only because of false positives). The one or more actions may include reading data, e.g., the one or more records that include the value. The one or more actions may include returning data to a query client, e.g., a copy of the one or more records that include the value. The one or more actions may include deleting data, e.g., the one or more records that include the value.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a data lake comprising a distributed object store; and
a data indexing system comprising one or more processors and one or more memories to store computer-executable instructions that, when executed, cause the one or more processors to:
generate a plurality of indices for a plurality of partitions in the data lake, wherein the partitions are archived using a plurality of storage resources, wherein the indices comprise a plurality of Bloom filters, and wherein an individual one of the Bloom filters corresponds to one or more fields of a plurality of records in the partitions;
receive a query indicating a value;
determine, using the Bloom filters, a candidate portion of the partitions that possibly comprise the value and a non-candidate portion of the partitions that do not comprise the value; and
determine, using the candidate portion of the partitions and not the non-candidate portion of the partitions, one or more records that comprise the value in one or more partitions of the candidate portion of the partitions.

2. The system as recited in claim 1, wherein the individual one of the Bloom filters comprises a probabilistic data structure generated using one or more hash functions, wherein the individual one of the Bloom filters represents a plurality of values and indicates whether the value is possibly included or is not included in the plurality of values, and wherein the plurality of values are determined using an individual one of the partitions corresponding to the individual one of the Bloom filters.

3. The system as recited in claim 1, wherein the one or more memories store additional computer-executable instructions that, when executed, cause the one or more processors to:
delete the one or more records from the one or more partitions.

4. The system as recited in claim 3, wherein the value comprises a user identifier, and wherein the one or more records are associated with the user identifier.

5. A method, comprising:
generating, by a data indexing system, a plurality of indices for a plurality of partitions in a distributed object store, wherein the indices comprise a plurality of probabilistic data structures, and wherein an individual one of the probabilistic data structures corresponds to one or more fields of an individual one of the partitions;
determining, by the data indexing system using the probabilistic data structures, a first portion of the partitions that possibly comprise a value and a second portion of the partitions that do not comprise the value; and determining, by the data indexing system based at least in part on a scan of the first portion of the partitions and not the second portion of the partitions, one or more partitions of the first portion of the partitions that comprise the value.

6. The method as recited in claim 5, wherein the probabilistic data structures comprise a plurality of Bloom filters, and wherein the first portion of the partitions and the second portion of the partitions are determined using the plurality of Bloom filters.

7. The method as recited in claim 5, wherein the individual one of the probabilistic data structures is generated using one or more hash functions, wherein the individual one of the probabilistic data structures represents a plurality of values and indicates whether the value is possibly included or is not included in the plurality of values, and wherein the plurality of values are derived from the one or more fields of the individual one of the partitions corresponding to the individual one of the probabilistic data structures.

8. The method as recited in claim 5, further comprising:
deleting one or more records associated with the value from the one or more partitions that comprise the value.

9. The method as recited in claim 8, wherein the value comprises a user identifier, and wherein the one or more records are associated with the user identifier.

10. The method as recited in claim 5, wherein the distributed object store stores a plurality of objects according to no schema or according to a partial schema.

11. The method as recited in claim 5, wherein a size of the individual one of the probabilistic data structures is determined based at least in part on a size of the corresponding individual one of the partitions.

12. The method as recited in claim 5, further comprising:
generating, by the data indexing system, a larger version of the individual one of the probabilistic data structures;
determining, by the data indexing system using the larger version of the individual one of the probabilistic data structures, a third portion of the partitions that possibly comprise an additional value and a fourth portion of the partitions that do not comprise the additional value; and
determining, by the data indexing system based at least in part on a scan of the third portion of the partitions and not the fourth portion of the partitions, one or more partitions of the third portion of the partitions that comprise the additional value.

13. One or more non-transitory computer-readable storage media storing program instructions that, when executed on or across one or more processors, perform:
generating a plurality of indices for a plurality of partitions in a distributed set of object stores, wherein the indices comprise a plurality of Bloom filters, and wherein an individual one of the Bloom filters corresponds to one or more fields of an individual one of the partitions;

determining, using the Bloom filters, a first portion of the partitions that possibly comprise a value and a second portion of the partitions that do not comprise the value; and
performing a scan of the first portion of the partitions and not the second portion of the partitions; and
determining, based at least in part on the scan, one or more records that comprise the value in one or more partitions of the first portion of the partitions.

14. The one or more non-transitory computer-readable storage media as recited in claim 13, wherein the individual one of the Bloom filters comprises a probabilistic data structure generated using one or more hash functions, wherein the individual one of the Bloom filters represents a plurality of values and indicates whether the value is possibly included or is not included in the plurality of values, and wherein the plurality of values are determined using the one or more fields of the individual one of the partitions corresponding to the individual one of the Bloom filters.

15. The one or more non-transitory computer-readable storage media as recited in claim 13, further comprising additional program instructions that, when executed on or across the one or more processors, perform:
deleting the one or more records from the one or more partitions of the first portion of the partitions.

16. The one or more non-transitory computer-readable storage media as recited in claim 13, wherein the first portion of the partitions are determined based at least in part on one or more machine learning techniques configured to predict contents of the plurality of partitions.

17. The one or more non-transitory computer-readable storage media as recited in claim 13, wherein one or more false positives are added to the first portion of the partitions based at least in part on the Bloom filters.

18. The one or more non-transitory computer-readable storage media as recited in claim 13, wherein a size of the individual one of the Bloom filters is determined based at least in part on a size of the corresponding individual one of the partitions.

19. The one or more non-transitory computer-readable storage media as recited in claim 13, wherein a size of the individual one of the Bloom filters is determined based at least in part on an entropy or false positive rate.

20. The one or more non-transitory computer-readable storage media as recited in claim 13, further comprising additional program instructions that, when executed on or across the one or more processors, perform:
generating a smaller version of the individual one of the Bloom filters;
determining, using the smaller version of the individual one of the Bloom filters, a third portion of the partitions that possibly comprise an additional value and a fourth portion of the partitions that do not comprise the additional value; and
determining, based at least in part on a scan of the third portion of the partitions and not the fourth portion of the partitions, one or more partitions of the third portion of the partitions that comprise the additional value.

* * * * *